(12) United States Patent
Zhou et al.

(10) Patent No.: US 11,092,560 B2
(45) Date of Patent: Aug. 17, 2021

(54) DEVICE AND METHOD FOR REALIZING HIGH-SPEED TEMPERATURE DROP OF MICRO MATERIAL BY DROPLET COOLING

(71) Applicant: NANJING UNIVERSITY, Nanjing (CN)

(72) Inventors: Dongshan Zhou, Nanjing (CN); Evgeny Zhuravlev, Rostock (DE); Jing Jiang, Nanjing (CN); Shaochuan Luo, Nanjing (CN); Christoph Schick, Kazan (RU); Qi Xue, Nanjing (CN); Xiaoliang Wang, Nanjing (CN); Wei Chen, Nanjing (CN); Wei Jiang, Nanjing (CN); Qing Ji, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 221 days.

(21) Appl. No.: 16/370,734

(22) Filed: Mar. 29, 2019

(65) Prior Publication Data
US 2019/0242837 A1    Aug. 8, 2019

(51) Int. Cl.
*G01N 25/72*  (2006.01)
*G01N 25/02*  (2006.01)

(52) U.S. Cl.
CPC ............ *G01N 25/72* (2013.01); *G01N 25/02* (2013.01)

(58) Field of Classification Search
None
See application file for complete search history.

(56) References Cited

U.S. PATENT DOCUMENTS

| | | | | |
|---|---|---|---|---|
| 9,114,413 | B1* | 8/2015 | Gomez | B05B 5/0533 |
| 2008/0150972 | A1* | 6/2008 | Srinivasan | G06T 3/4023 |
| | | | | 347/5 |
| 2008/0304542 | A1* | 12/2008 | Danley | G01K 17/00 |
| | | | | 374/31 |
| 2014/0348201 | A1* | 11/2014 | Shapland | G01K 17/20 |
| | | | | 374/29 |

\* cited by examiner

*Primary Examiner* — Erica S Lin
(74) *Attorney, Agent, or Firm* — CBM Patent Consulting, LLC (57) ABSTRACT

The present invention discloses an apparatus for realizing high-speed cooling of a trace material by using liquid drop cooling, which comprises an injector connected with an injection driver and used for dropwise adding a volatile cooling liquid; a temperature sensor placed below the injector; a data collector used for collecting a thermopile signal and a heating resistor signal of the temperature sensor; a gas purger used for purging a cooled sample; and a control center, wherein the injector, the temperature sensor, the data collector and the gas purger are all connected with the control center.

7 Claims, 9 Drawing Sheets

DEVICE AND METHOD FOR REALIZING HIGH-SPEED TEMPERATURE DROP OF MICRO MATERIAL BY DROPLET COOLING

TECHNICAL FIELD

The present invention relates to the technical field of material microstructure and thermal properties acquisition and analysis, generation of highly metastable state of material and more particularly, to an apparatus and a method for realizing high-speed cooling by using liquid drop cooling.

BACKGROUND

In the industry, a sample is usually quenched from melt to solid (such as injection molding, film blowing, etc.) at a cooling rate higher than 1000 K/s, and in such a complicated process, materials with different degrees of ordered structures and recombinant structures may be formed, including some polymer, metal, blends, alloy, etc. However, the recently rapidly developed additive technology and 3D printing technology also involve the process of much faster cooling (up to 100,000 K/s) of a small amount of melt. Therefore, it is very important to simulate industrial fast cooling by an experimental method and understand a quenching process of the trace material (from nanograms to dozens of micrograms), which can help us understand what happened in the material during the fast cooling process in the industry, thus guiding the future industrial production better.

The metal and polymer are very important materials, and both need the cooling rates that cannot be achieved by traditional method. By reducing a sample size and using gas cooling, controllable high-speed cooling can be realized. An ultra-fast scanning calorimeter (FSC) is such an outstanding technical means to observe the material in the process of high-speed temperature increase and decrease. It can not only prepare the sample with accurate thermal history, but also analyze it at a very high scanning rate, and capture structural snapshots of tiny sample at different temperatures or times through ultra-high-speed scanning (which is usually more than 100,000 K/s). However, FSC's fast scanning also has the limitation thereof, especially has the requirement for sample quality and the influence on the scanning rate when the sample temperature reaches the ambient temperature.

Figure 1:
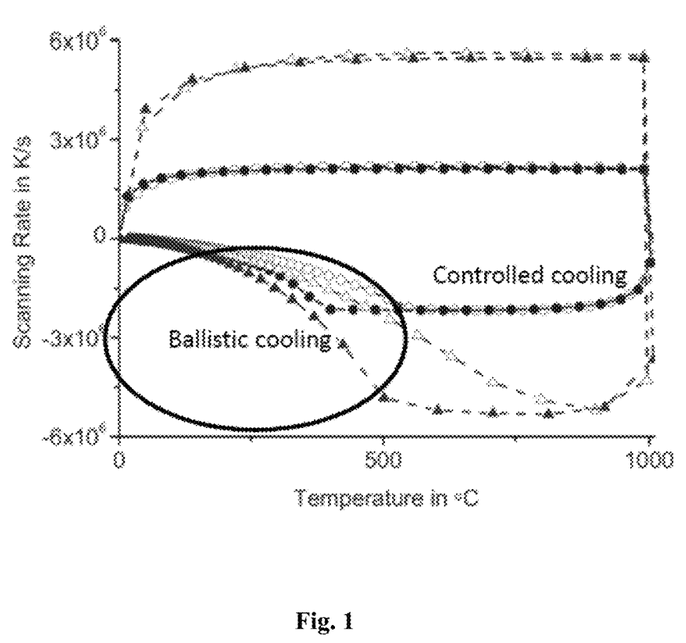
FIG. 1 is a schematic diagram of ballistic cooling.

Since the gas has excellent thermal conductivity coefficient and heat capacity, and low thermal inertia, gas cooling is very effective when the sample needs to be quickly switched from heating to cooling. However, also because of the nature of these gas, when the temperature difference between the sample and the gas approaches zero, the cooling efficiency may be obviously limited. In fact, a sensor used by FSC can achieve a cooling rate of $10^6$ K/s only when the temperature is higher than an gas temperature of 500 K, can only achieve 1000 K/s when the temperature is higher than a furnace temperature of 100 K, and can only achieve 100 K/s when the temperature is higher than the furnace temperature of 50 K. When the temperature reaches a certain value below, the cooling rate is decreased sharply, this phenomenon is called ballistic cooling (as shown in FIG. 1), especially for the sample with larger mass, and the influence of the ballistic cooling is especially obvious. If helium is used instead of gas, the ballistic cooling can be significantly decreased, or the ballistic cooling can be avoided at a specific temperature by decreasing the gas temperature, such as conducting experiment in liquid nitrogen cooled gas or helium. However, this method is not always feasible and may be affected by an experimental platform and a test condition.

SUMMARY

Object of the invention: aiming at the problems of current techniques described above, the present application provides an apparatus for high-speed cooling by using liquid cooling instead/additionally to gas cooling to achieve a higher cooling rate, and provides a method for realizing ultrahigh-speed cooling by using the apparatus.

Technical solution: an apparatus for realizing high-speed cooling of a trace material by using liquid drop cooling according to the present invention comprises: an injector connected with an injection driver and used for dropwise adding a volatile cooling liquid; a temperature sensor placed below the injector, which comprises a thermopile cold junction and a thermopile hot junction, is internally provided with a heating resistor, and has a silicon nitride film attached to a surface, wherein the trace material is placed on the silicon nitride film; a data collector used for collecting a thermopile signal and a heating resistor signal of the temperature sensor; a gas purger; and a control center, wherein the injector, the temperature sensor, the data collector and the gas purger are all connected with the control center.

The apparatus needs to control a size and a flow rate of cooling liquid drops by the injection driver and the injector to ensure that the cooling liquid drops are contacted with a surface of a sample instead of the film of the sensor, in which case a cooling efficiency is the highest.

The injector used for injecting the liquid drops may be any apparatus that can enable the liquid to form stable trickle or liquid drops, where the pre-cooled liquid is provided under slight overpressure to the nozzle. The injector can also be other injection apparatuses, such as a microfluidic apparatus, inkjet or even simple medical syringe etc. It should be noted that a diameter of the liquid drop needs to be larger than a diameter of the sample, the larger the diameter of the liquid drop is, the higher the cooling efficiency is. In general, the liquid drops with a diameter of about 1-2 mm can realize the optimal cooling at high speed of the sample of 20 μm.

Further, the cooling liquid is a liquid with a certain volatility, the cooled sample may be purged by a dry gas flow, and the cooling liquid drops are removed at an ambient temperature without changing a thermal history of the sample. Due to Leidenfrost effect, too fast liquid evaporation may cause formation of the isolating gas layer, thus affecting the cooling efficiency; and in addition, when test areas of the sensor are different, boiling conditions of the cooling liquid drops are also different, so that the cooling liquids with different properties need to be selected according to the sensors with different areas. For example, cold ethanol with a temperature ranging from −50° C. to 0° C., cools well from 400 K down to room temperature.

Any sample that does not dissolve or absorb the cooling liquid may be used in the apparatus, and a diameter of the sample may range from several microns to several hundred microns according to a heating area of the temperature sensor used.

The temperature sensor is any currently available commercial vacuum gauge film sensor (XENSOR.NL), such as XI394, XI395, XI400, self-made membrane or ceramic based sensor, etc. Further, the X1394 measurement area adopted in the present application is 8*6 μm$^2$, the X1395 measurement area is 60*60 μm$^2$, and a diameter of the X1400 measurement area is 500 μm.

The heating resistor on the sensor can preheat the sample to a specified temperature before cooling as required, due to a voltage required for heating and the limitation of a heating resistor material on the sensor, a heating range of the sample on a sensor is 0 to 1300 K. A gas purging flow of the gas purger may be dry nitrogen, air, argon, etc., which is specifically determined according to use environment and the test sample, so as to remove the cooling liquid drops without changing a temperature of the sample.

A cooling rate in a whole cooling process by using the apparatus is more than $10^6$ K/s, so that the whole cooling process from the approach of the liquid drops to the completion of the cooling may be completed within 10 ms.

An improved fast scanning calorimeter is integrated with the apparatus for realizing high-speed cooling of a trace material by using liquid drop cooling.

Further, the apparatus for realizing high-speed cooling of a trace material by using liquid drop cooling is attached to a sample room of the fast scanning calorimeter, comprising but being not limited to a room temperature open platform, a cold and hot platform, a vacuum tube, and further improvement of the cooling rate is effectively realized without affecting further fast thermal analysis and structure analysis.

The fast scanning calorimeter may be FSC equipment currently available, for example, accessories may be superposed for an open room temperature system, a cold and hot platform-type closed system and a tube-dewar type.

A method for realizing high-speed cooling of a trace material by using the apparatus above comprises the following steps:

(1) sample preheating: placing a sample on the silicon nitride film of the temperature sensor, and preheating the sample to a specified temperature by using the heating resistor on the temperature sensor;

(2) high-speed cooling and data collection: dropwise adding or spraying, by the injector, a cooling liquid on the surface of the sample preheated in step (1) in the form of liquid drops, and tracking, by the data collector, a change of the thermopile signal during an approaching process of the liquid drops, wherein when the liquid drops approach the sample, a temperature of the sample starts to decrease, and the thermopile signal used for tracking the temperature of the sample deviates from the specified temperature set in step (1), and when a temperature difference ΔT of the sample decreased is larger than a preset trigger value $\Delta T_{trigger}$, triggering to turn off the heating resistor; and meanwhile, continuously monitoring the temperature of the sample with microsecond precision, monitoring a cooling rate and phase transition possibly occurring to the sample, and collecting data to perform subsequent data analysis; and (3) sample drying: after completing the cooling according to the data collected in step (2), starting the gas purger to remove the cooling liquid drops through the control center at an ambient temperature; and performing fast thermal analysis or structural analysis of sample materials in situ on the sample without liquid drop residue. The specified temperature in step (1) needs to be specifically set according to experimental requirements, and the specified temperature of the sample can generally be in a maximum range of 100 K to 800 K. When the gold sensor is used, the maximum temperature range of the sample may be 100 K to 1300 K.

In step (2), an internal triggering process controlled by the data collector may be realized within microseconds, the approaching process of the liquid drops may be tracked before the liquid drops touch the sample, a temperature control system (i.e., heating resistor) for the sample is turned off when necessary to achieve an optimal cooling rate, and the cooling rate may be affected if the heating resistor is turned off too early or too late. During the cooling process, the temperature of the sample is continuously monitored with microsecond precision, and a temperature signal may show the cooling rate and possible phase transition of the sample.

Since a reference temperature of the cold junction is the ambient temperature, when the reference temperature (cold junction) of the thermopile signal is unreliable, for example, when a temperature of the liquid drops is much lower than the temperature of the sensor, the existing heating resistor on the sensor may be used for temperature measurement and correction.

Since a temperature of the cooling liquid drops is lower than that of a preheated sample, combined with the contact of the liquid drops and the shutdown of the heater, the fast cooling of the sample can be realized.

In step (1), any sample that does not dissolve or absorb the cooling liquid may be used in the apparatus, and a diameter of the sample may range from several microns to several hundred microns according to a heating area of the temperature sensor used.

In step (2), the cooling liquid is any volatile liquid, for example, cold ethanol with a temperature ranging from −50° C. to 0° C., which is preferably −20° C.

In step (3), the cooled sample needs to be purged by the dry gas flow, and the cooling liquid drops are removed at the ambient temperature without changing the thermal history of the sample. A gas flow of the purging is 0 to 10 L/min. Flow and purging time be set depends on the gas and the cooling liquid. For ethanol, the purging may be performed for 30 s at 1 L/min. After fast cooling, fast thermal analysis may be performed on the sample in situ, comprising re-heating analysis on a structure of the cooled sample, or further thermal treatment, such as isothermal or non-isothermal experiments; and other morphological characterizations or mechanical characterizations may also be performed without transferring to other equipment.

Beneficial effects: the high-speed cooling apparatus according to the present application may achieve the cooling rate higher than that of general surrounding gas cooling by contacting the coolant liquid drops with the sample and closing the heater by fast response through program control; meanwhile, the cooling rate and phase transition possibly occurring to the sample can be tracked by collecting the thermopile signal or the heating resistor signal; and the volatile liquid is used, and next heat treatment or morphology characterization can be performed in situ after removing the cooling liquid drops by gas purging. The high-speed cooling method according to the present application may be used for obtaining special phases of sample materials, may be combined with the existing ultra-fast scanning calorimetry technology, expands the high-speed cooling rate of the trace sample, realizes simulation of an industrial quenching process, and simultaneously performs in-situ thermal analysis and microstructure characterization on the material obtained by high-speed cooling.

For example, for some industrial-grade resins (such as homogeneous nucleated polyethylene PE or polytetrafluoroethylene PTFE) crystallizing very fast, even using the gas to cool the sample of very small mass cannot meet the requirements of the cooling rate thereof, while a crystallization rate of a metal material is faster. In this case, additional liquid cooling may be of great help. The method for realizing high-speed cooling by using liquid drop cooling may be combined with the existing fast scanning calorimeter to realize high-speed cooling and perform subsequent calorimetry characterization and other microstructure characterizations according to different requirements of the cooling rate, use environments and instrument communication conditions, and obtaining the complementary information can help to more comprehensively explain the influence of fast cooling and the performance of plastic or metal alloy products prepared after fast cooling. The use of the liquid for additional cooling may greatly expand the limitation of traditional FSC and enable the FSC to be a very industrially attractive instrument.

DETAILED DESCRIPTION

The present application is described in detail hereinafter with reference to the specific embodiments.

First Embodiment

Figure 2:
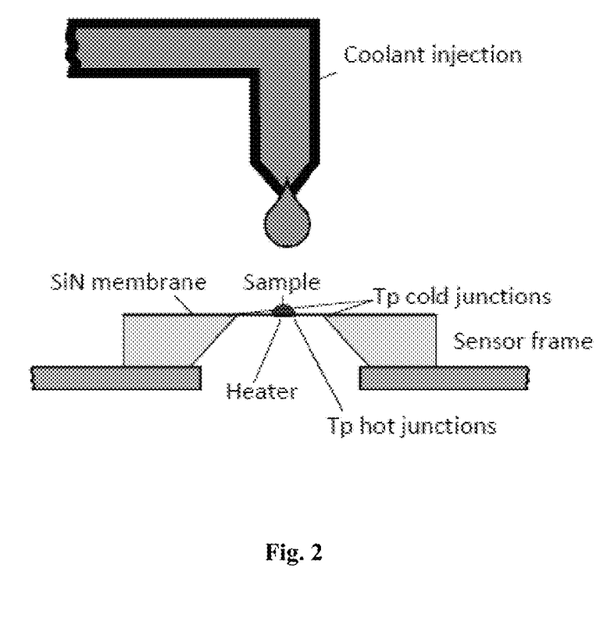
FIG. 2 is a schematic diagram illustrating a basic structure of an apparatus for realizing high-speed cooling of a trace material by using liquid drop cooling.
Figure 3:
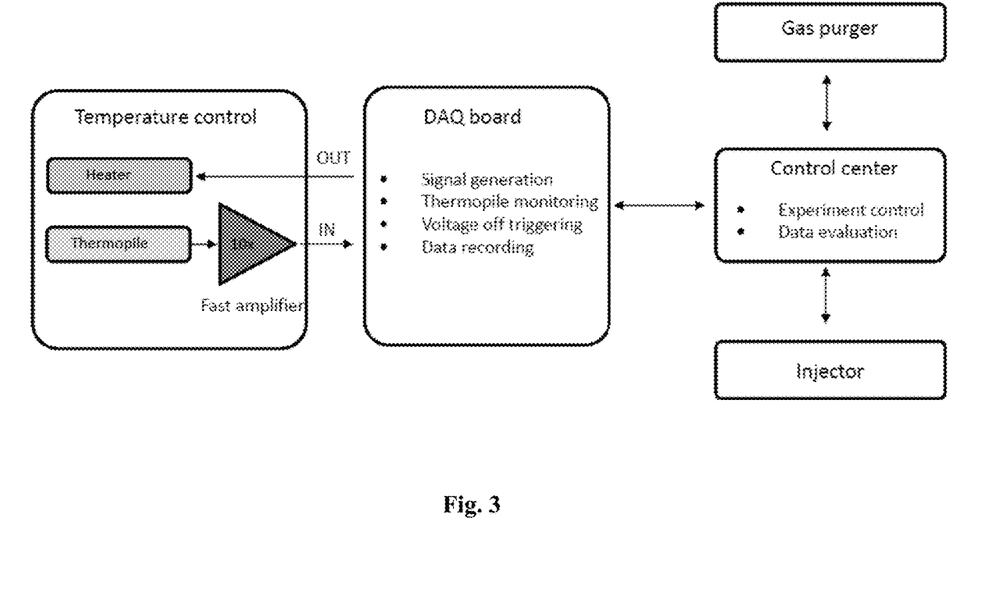
FIG. 3 is a schematic diagram illustrating a structure of the apparatus according to the present application.

As shown in FIG. 2 and FIG. 3, an apparatus for realizing high-speed cooling of a trace material by using liquid drop cooling comprises an injector connected with an injection driver and used for dropwise adding a volatile cooling liquid; a temperature sensor placed below the injector, which comprises a thermopile cold junction and a thermopile hot junction, is internally provided with a heating resistor, and has a silicon nitride film attached to a surface, wherein the trace material is placed on the silicon nitride film; a data collector used for collecting a thermopile signal and a heating resistor signal of the temperature sensor; a gas purger used for purging a cooled sample; and a control center, wherein the injector, the temperature sensor, the data collector and the gas purger are all connected with the control center.

Second Embodiment

Figure 4:
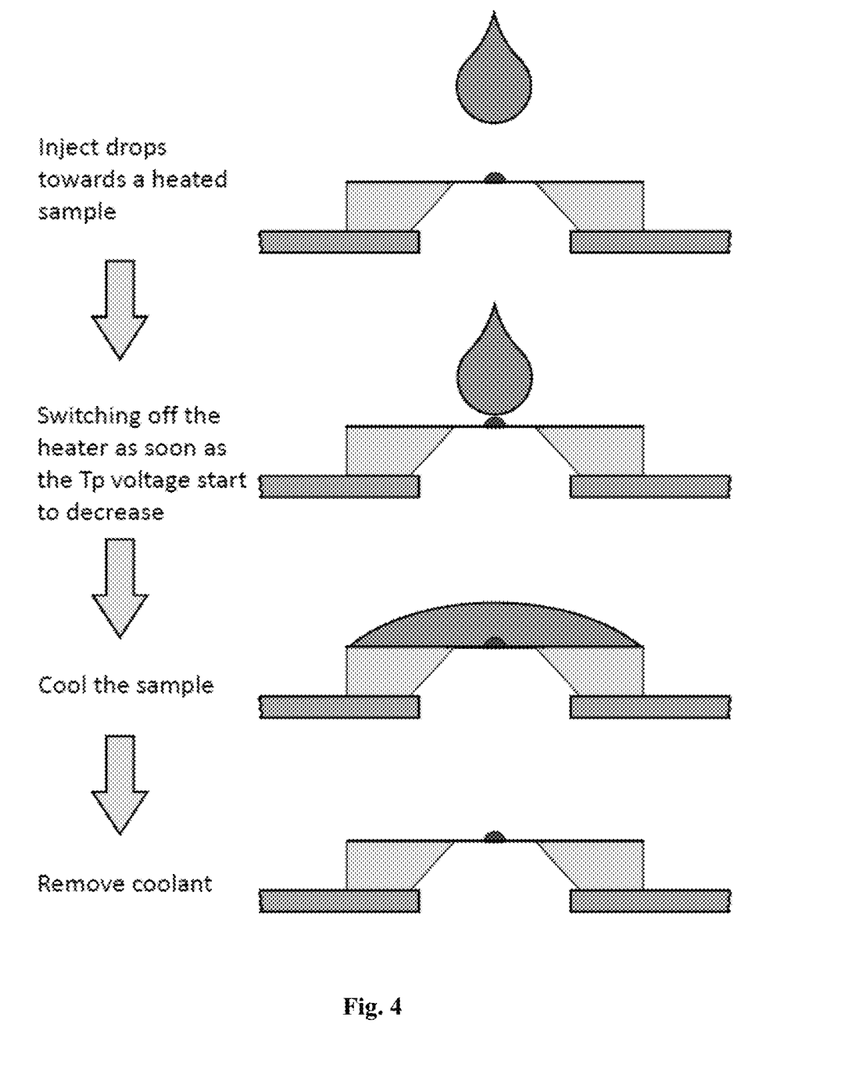
FIG. 4 is a schematic diagram illustrating details of a cooling process.
Figure 5:
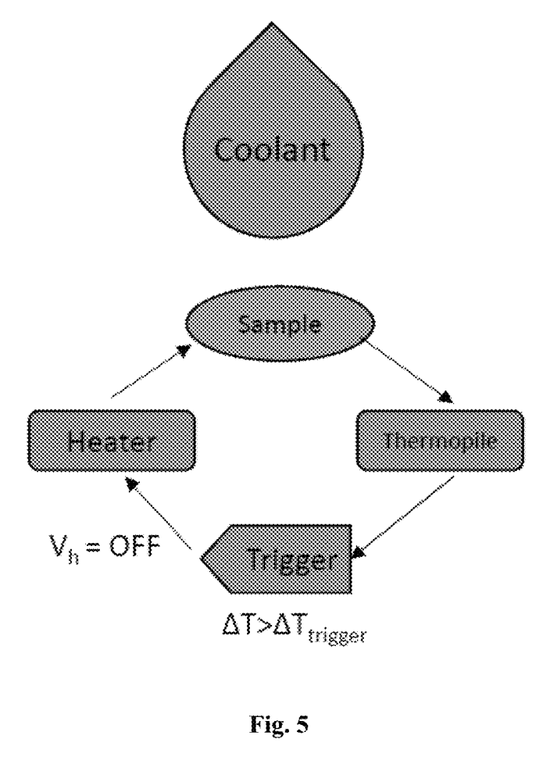
FIG. 5 is a schematic diagram illustrating a working principle of liquid cooling.
Figure 6:
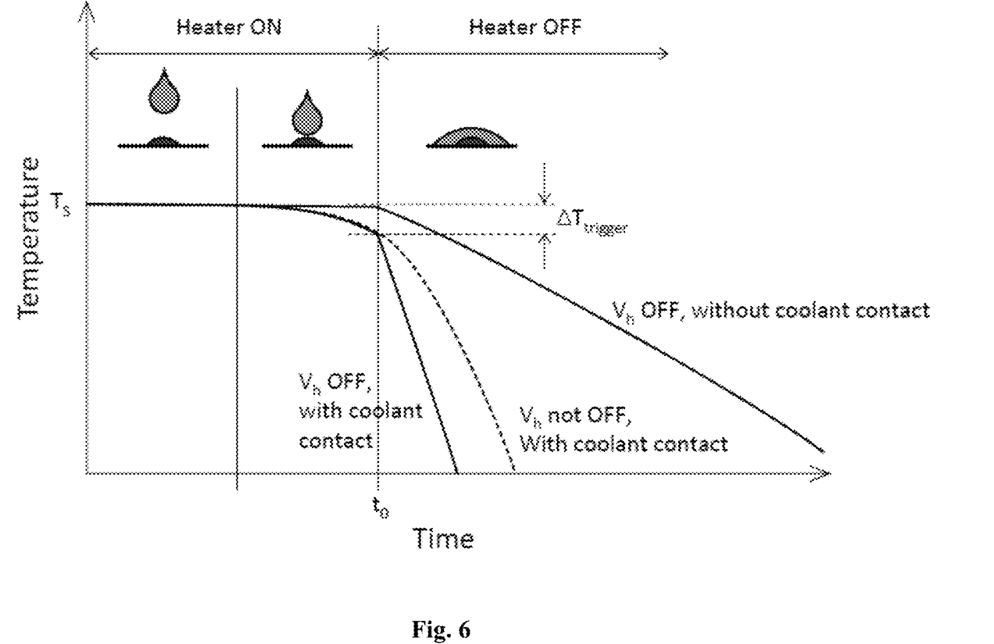
FIG. 6 is a schematic diagram illustrating a process of triggering to turn off a heating resistor in step 2 according to the present application.

A method for realizing high-speed cooling of a trace material by using the apparatus according to the first embodiment, as shown in FIG. 4, comprises the following steps:

(1) sample preheating: placing a sample on the silicon nitride film of the temperature sensor, and preheating the sample to a specified temperature by using the heating resistor on the temperature sensor;

(2) high-speed cooling and data collection: dropwise adding or spraying, by the injector, a cooling liquid on a surface of the sample preheated in step (1) in the form of liquid drops, and tracking, by the data collector, a change of the thermopile signal during an approaching process of the liquid drops, as shown in FIG. 5 and FIG. 6, wherein when the liquid drops approach the sample, a temperature of the sample starts to decrease, and the thermopile signal used for tracking the temperature of the sample deviates from the specified temperature set in step (1), and when a temperature difference $\Delta T$ of the sample decreased is larger than a preset trigger value $\Delta T_{trigger}$, triggering to turn off the heating resistor; and meanwhile, continuously monitoring the temperature of the sample with microsecond precision, monitoring a cooling rate and phase transition possibly occurring to the sample, and collecting data to perform subsequent data analysis; and (3) sample drying: after completing the cooling according to the data collected in step (2), starting the gas purger to remove the cooling liquid drops through the control center at an ambient temperature, and performing fast thermal analysis or structural analysis of sample materials in situ on the sample without liquid drop residue to complete the cooling.

In step (2), the cooling liquid is cold ethanol as an example with a temperature of −20° C. In step (1), the specified temperature ranges from 100 K to 800 K, when a gold sensor is used, a maximum temperature range of the sample may be 100 K to 1300 K. In step (3), a purge gas flow of the gas purger is 1 L/min to purge for 30 s.

First Comparison Example

Figure 9:
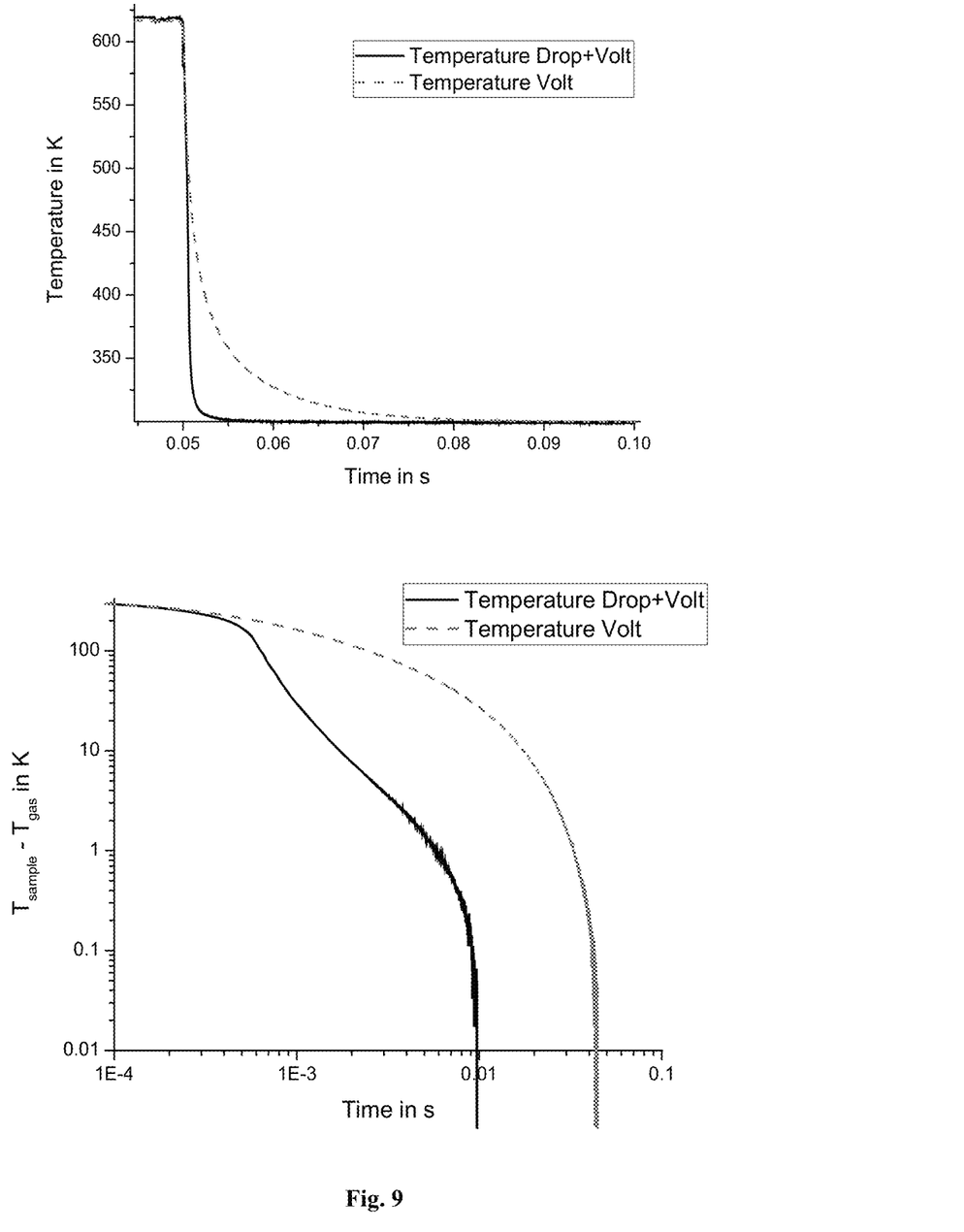
FIG. 9 is a comparison diagram of a liquid cooling effect of the present application and a traditional gas cooling effect.

The apparatus shown in the first embodiment and the existing traditional gas cooling apparatus were used for cooling under the same conditions, and the results were shown in FIG. 9. As can be seen from the figure, the liquid drop cooling (black solid line) is obviously superior to the atmosphere cooling (gray dashed line) in the cooling rate performances. A linear coordinate is −a, and a log-log coordinate is −b.

Second Comparison Example

The apparatus shown in the first embodiment was used to perform comparative tests on the liquid drop cooling and gas cooling performances on several sensors of different specifications. The sensors comprised X1394 (a measurement area was 8*6 μm$^2$), X1395 (a measurement area was 60*60 μm$^2$) and X1400 (a diameter of measurement area was 500 μm), the test results were shown in FIG. 10, and the comparative data was shown in the following table. As can be seen, the boiling of cold ethanol on the X1400 sensor (UHC-1 Flash DSC sensor, with a diameter of 500 μm and a thickness of 2 m) reduces the liquid cooling performance (gray curve), but is still much better than that of the original slow-speed cooling (black curve). The gray curve is a result of the liquid cooling (gray dashed line) or traditional cooling (black dashed line) on the X1395 sensor (60*80 μm², with a thickness of 1 μm) at the same temperature. Thus it may be seen that the area of the sensor has a great influence on the cooling effect, and the larger the area of the sensor is, the more serious the boiling phenomenon of the cooling liquid is, and the lower the cooling rate is. However, even for the X1400 sensor with the largest test area, the cooling rate achieved by using additional liquid drop cooling is much better than the effect of the traditional gas cooling.

Figure 10:
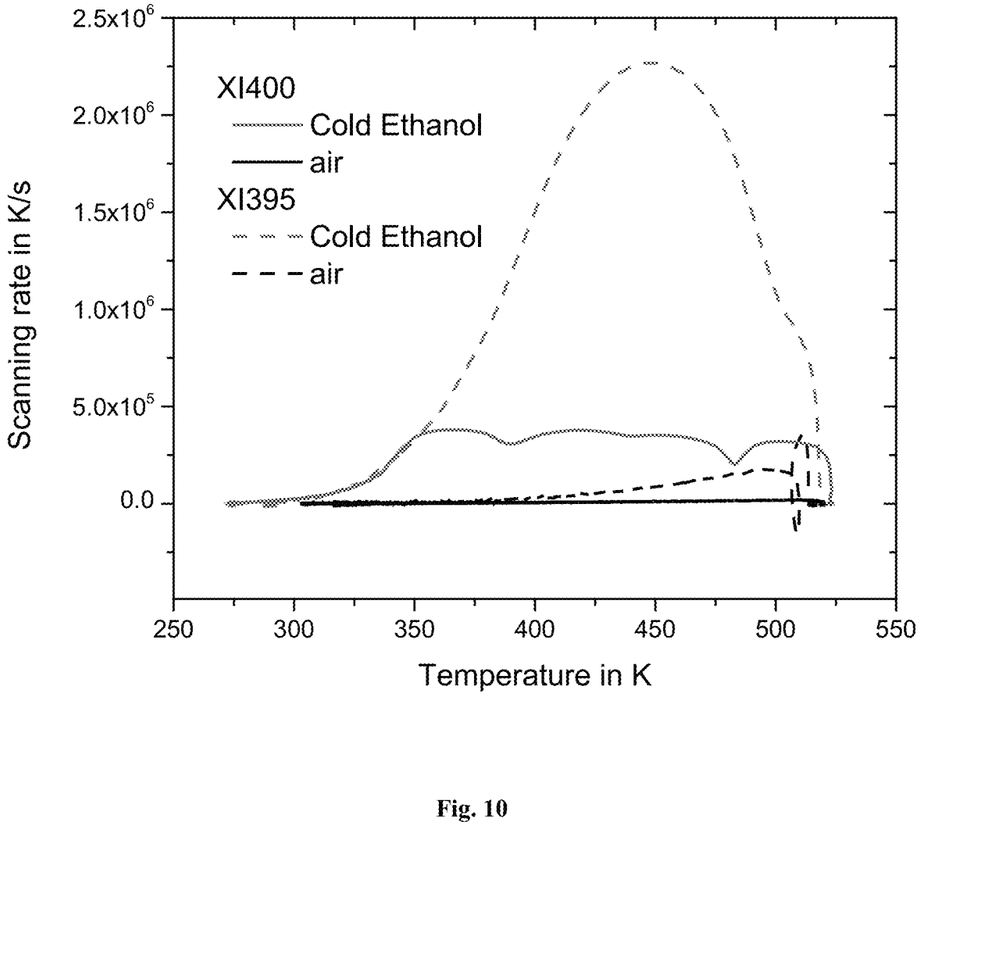
FIG. 10 is a comparison diagram of cooling effects on sensors with different areas using cold ethanol as a cooling liquid, wherein the smaller the area of the sensor is, the less the boiling of the liquid is, and the higher the cooling rate may be achieved.

| Sensor | Maximum cooling rate (K/s) | |
|---|---|---|
|  | Gas cooling | Liquid cooling |
| X1400 | $2 * 10^4$ | $3.8 * 10^5$ |
| X1395 | $1.8 * 10^5$ | $2.3 * 10^6$ |

Third Embodiment

Figure 7:
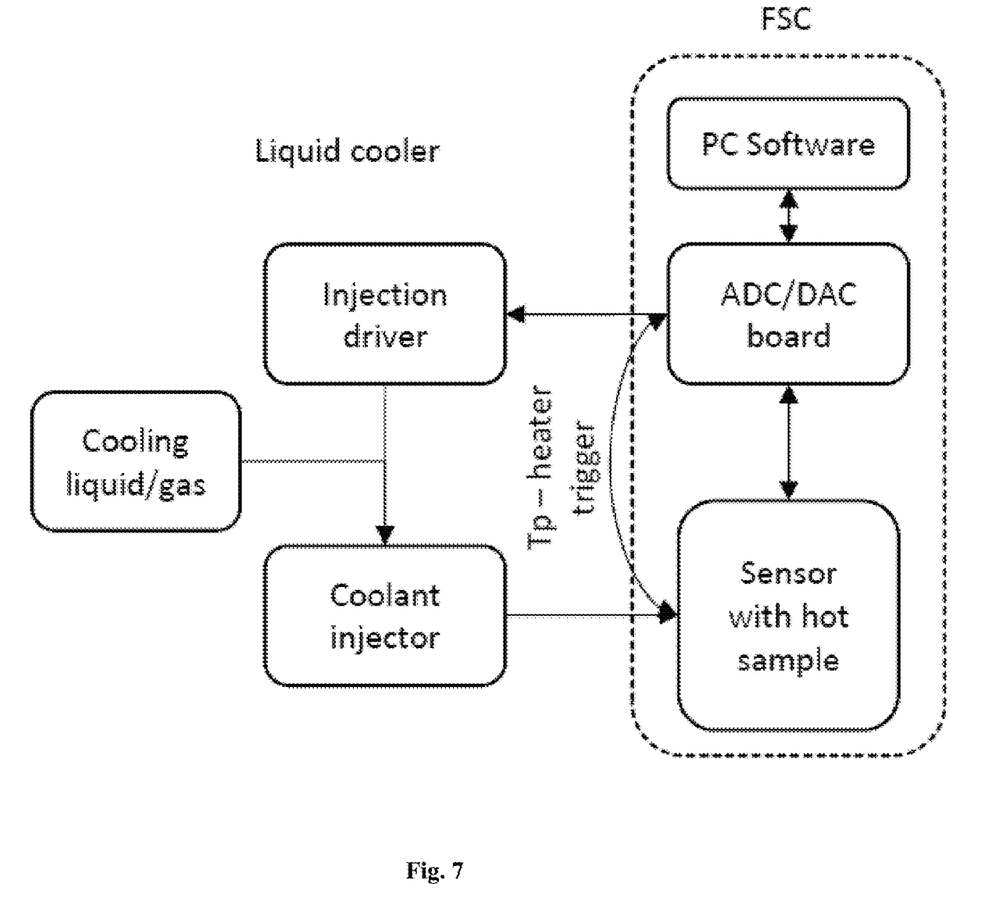
FIG. 7 is a schematic diagram illustrating a simple principle of combining a liquid cooling apparatus with the existing fast scanning calorimeter FSC.
Figure 8:
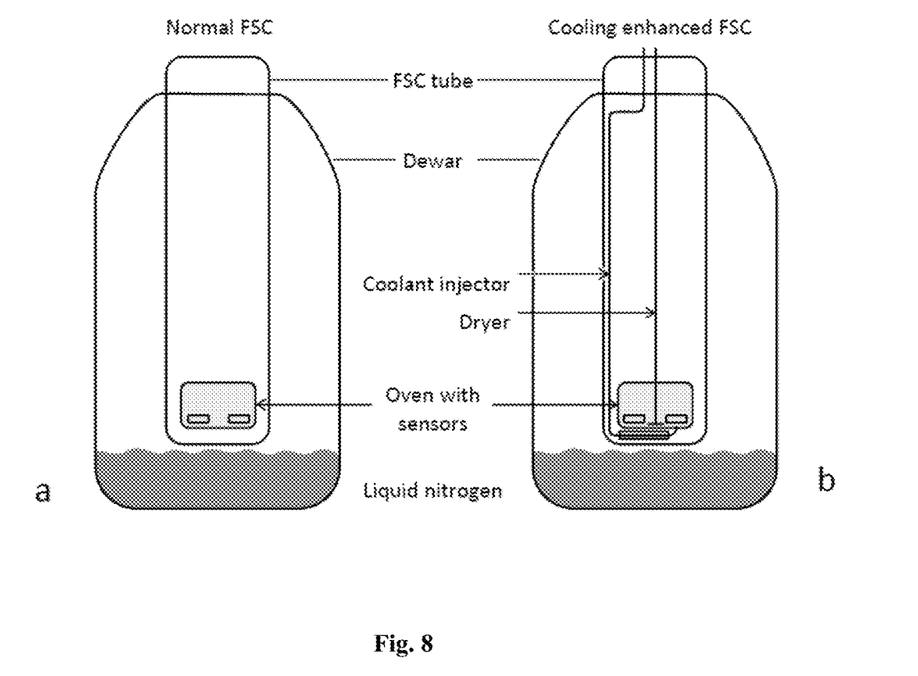
FIG. 8 is a schematic diagram illustrating comparisons between a tube-dewar type gas cooling FSC apparatus and a combination of the liquid cooling apparatus with the tube-dewar type FSC apparatus.

FIG. 8 illustrates a tube-dewar type fast scanning calorimeter FSC integrated with the apparatus according to the first embodiment. A sample chamber of the apparatus according to the first embodiment was put into a vacuum tube in a Dewar bottle. A basic principle diagram thereof was shown in FIG. 7. Since a furnace provided with a sensor could maintain a very low temperature (about 80 K), a usable temperature range and a scanning rate thereof could be greatly improved. Moreover, with an additional liquid drop cooling apparatus, the fastest cooling rate of the fast scanning calorimeter at present could be achieved.

What is claimed is:

1. An apparatus for realizing high-speed cooling of a trace material by using liquid drop cooling, comprising:
   an injector connected with an injection driver and used for dropwise adding a volatile cooling liquid;
   a temperature sensor placed below the injector, which comprises a thermopile cold junction and a thermopile hot junction, is internally provided with a heating resistor, and has a silicon nitride film attached to a surface, wherein the trace material is placed on the silicon nitride film;
   a data collector used for collecting a thermopile signal and a heating resistor signal of the temperature sensor;
   a gas purger used for purging a cooled sample to remove the volatile cooling liquid with a gas that is nitrogen, air or argon; and
   a control center, wherein the injector, the temperature sensor, the data collector and the gas purger are all connected with the control center;
   wherein the high-speed cooling is up to 10,000,000 K/s.

2. A fast scanning calorimeter, wherein the apparatus of claim 1 is integrated in a scanning calorimeter.

3. A method for realizing high-speed cooling of a trace material by using the apparatus of claim 1, wherein the high-speed cooling is up to 10,000,000 K/s;
   the method comprises the following steps:
   (1) sample preheating: placing a sample on the silicon nitride film of the temperature sensor, and preheating the sample to a specified temperature by using the heating resistor on the temperature sensor;
   (2) high-speed cooling and data collection: dropwise adding or spraying, by the injector, a cooling liquid on a surface of the sample preheated in step (1) in the form of liquid drops, and tracking, by the data collector, a change of the thermopile signal during an approaching process of the liquid drops, wherein when the liquid drops approach the sample, a temperature of the sample starts to decrease, and the thermopile signal used for tracking the temperature of the sample deviates from the specified temperature set in step (1), and when a temperature difference ΔT of the sample decreased is larger than a preset trigger value $\Delta T_{trigger}$, triggering to turn off the heating resistor; and meanwhile, continuously monitoring the temperature of the sample with microsecond precision, monitoring a cooling rate and phase transition possibly occurring to the sample, and collecting data to perform subsequent data analysis; and
   (3) sample drying: after completing the cooling according to the data collected in step (2), starting the gas purger to remove the cooling liquid drops through the control center at an ambient temperature; and performing fast thermal analysis or structural analysis of sample materials in situ on the sample without liquid drop residue.

4. The method according to claim 3, wherein in step (2), the cooling liquid is a volatile liquid.

5. The method according to claim 3, wherein in step (1), the specified temperature ranges from 100 K to 800 K.

6. The method according to claim 3, wherein in step (3), a gas flow of the gas purging is 0 to 10 L/min.

7. The method according to claim 4, wherein the volatile liquid is a cold ethanol with a temperature at −50° C. to 0° C.

* * * * *